`US008836963B2`

(12) United States Patent
Baba et al.

(10) Patent No.: US 8,836,963 B2
(45) Date of Patent: Sep. 16, 2014

(54) IMAGE PROCESSING APPARATUS, PROCESSING TIME SIMULATION APPARATUS AND NON-TRANSITORY COMPUTER READABLE MEDIUM

(71) Applicant: Fuji Xerox Co., Ltd., Tokyo (JP)

(72) Inventors: Motofumi Baba, Yokohama (JP); Hidenori Horie, Yokohama (JP); Kazuhiko Narushima, Yokohama (JP); Masafumi Ono, Yokohama (JP); Masayoshi Nakao, Ebina (JP); Kenji Kuroishi, Yokohama (JP); Keiko Shiraishi, Ebina (JP); Koichi Azuma, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 19 days.

(21) Appl. No.: 13/778,987

(22) Filed: Feb. 27, 2013

(65) Prior Publication Data

US 2014/0049789 A1 Feb. 20, 2014

(30) Foreign Application Priority Data

Aug. 15, 2012 (JP) .................................. 2012-180197

(51) Int. Cl.
 *G03G 15/20* (2006.01)
 *G06F 3/12* (2006.01)
 *H04N 1/00* (2006.01)

(52) U.S. Cl.
 CPC ......... *H04N 1/00986* (2013.01); *G03G 15/205* (2013.01); *G03G 15/2046* (2013.01)

USPC ................. 358/1.13; 399/67; 399/69; 399/70

(58) Field of Classification Search
 None
 See application file for complete search history.

(56) References Cited

U.S. PATENT DOCUMENTS

| 5,621,511 A * | 4/1997 | Nakayama ...................... 399/44 |
|---|---|---|
| 2002/0094212 A1 * | 7/2002 | Suzumi .......................... 399/69 |
| 2009/0290916 A1 | 11/2009 | Baba | |
| 2011/0311258 A1 * | 12/2011 | Monde ........................... 399/70 |

FOREIGN PATENT DOCUMENTS

| JP | A-8-286549 | 11/1996 |
|---|---|---|
| JP | A-2009-282413 | 12/2009 |

* cited by examiner

*Primary Examiner* — Marivelisse Santiago Cordero
*Assistant Examiner* — Moustapha Diaby
(74) *Attorney, Agent, or Firm* — Oliff PLC

(57) ABSTRACT

An image processing apparatus includes: a fixing device that has a fast heating mode and a heat storage mode; and a selection section that selects any one of a case where execution of a job indicating an image forming process of a predetermined batch throughput is instructed, and when the fixing device returns to a normal power state from a power saving state, the fixing mode in which an image forming process is early completed is selected on the basis of a total throughput of the job to perform the image forming process, and a case where during the total throughput of the job is not determined or in a case where the job corresponds to a plurality of sets, the fast heating mode is selected as an initial operation for at least the first set to perform the image forming process.

8 Claims, 14 Drawing Sheets

US 8,836,963 B2

IMAGE PROCESSING APPARATUS, PROCESSING TIME SIMULATION APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-180197 filed on Aug. 15, 2012.

BACKGROUND

Technical Field

The present invention relates to an image processing apparatus, a processing time simulation apparatus and a computer readable medium.

SUMMARY

According to an aspect of the invention, an image processing apparatus includes: a fixing device that has a fast heating mode in which temperature is relatively rapidly increased and a heat storage mode in which heat is stored in advance in a heat storage member for relatively high productivity, as a fixing mode in which a fixing member that heats a recording sheet for fixing is heated in advance, in a process of performing an image forming process with respect to the recording sheet; and a selection section that selects any one of a case where execution of a job indicating an image forming process of a predetermined batch throughput is instructed, and when the fixing device returns to a normal power state from a power saving state, the fixing mode in which the image forming process is early completed is selected on the basis of a total throughput of the job to perform the image forming process, and a case where during the total throughput of the job is not determined or in a case where the job corresponds to a plurality of sets, the fast heating mode is selected as an initial operation for at least the first set to perform the image forming process.

BRIEF DESCRIPTION OF THE DRAWINGS

Exemplary embodiment(s) of the present invention will be described in detail based on the following figures, wherein FIGS. 7A to 7D illustrate the fixing device according to the embodiment, in which FIG. 7A is a partial cross-sectional view illustrating a non-contact state of the contact/non-contact mechanism section, FIG. 7B is a front view illustrating a non-contact state of a thermosensitive magnetic member, FIG. 7C is a partial cross-sectional view illustrating a contact state of the contact/non-contact mechanism section, and FIG. 7D is a front view illustrating a contact state of the thermosensitive magnetic member.

DETAILED DESCRIPTION

Figure 1A:
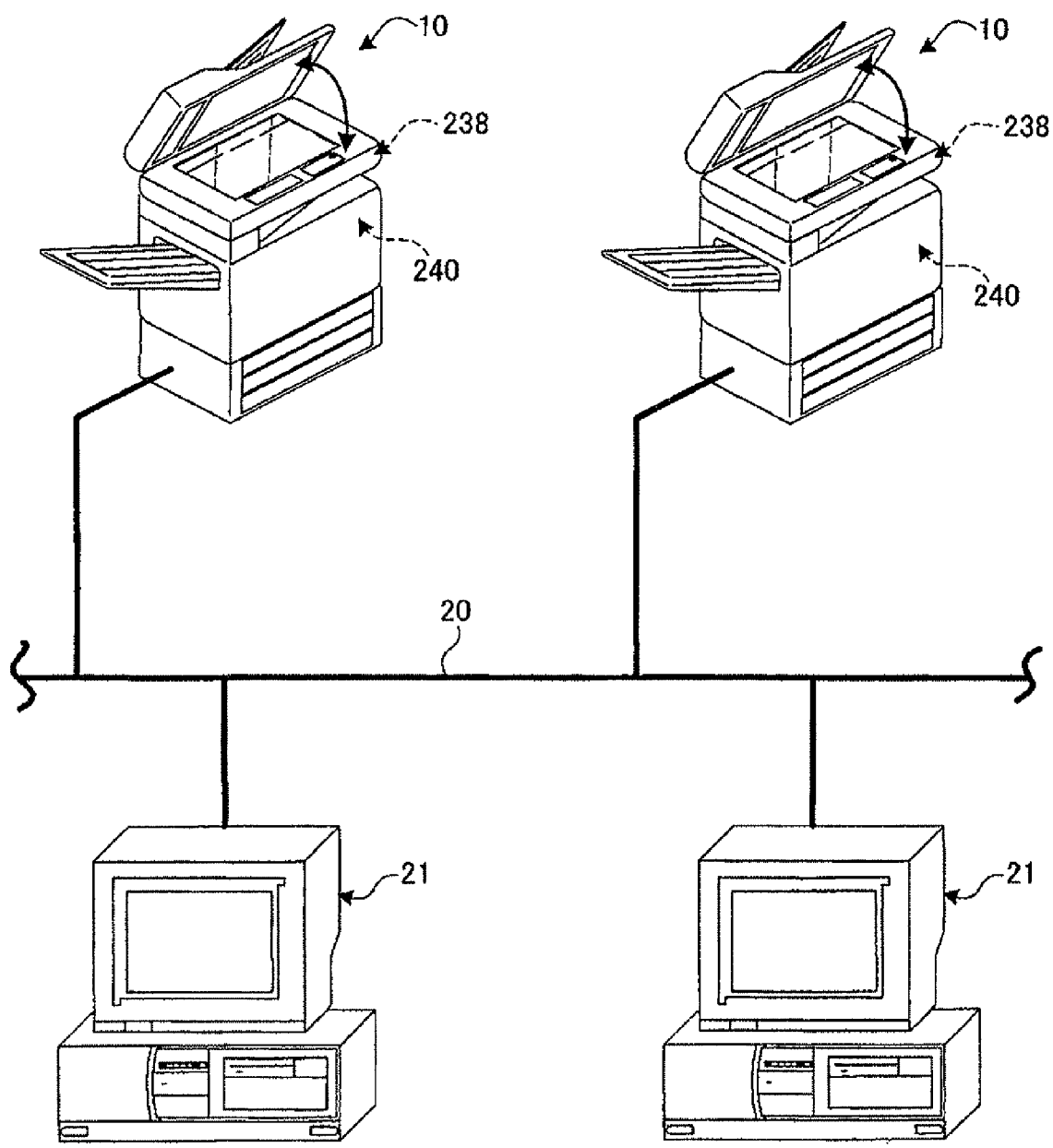
FIGS. 1A and 1B are connection diagrams illustrating a communication line network including image processing apparatuses according to an embodiment of the invention.

As shown in FIG. 1A, an image processing apparatus 10 according to an embodiment of the invention is connected to a communication line network 20 such as the Internet. In FIG. 1A, two image processing apparatuses 10 are connected, but the number of the apparatuses is not limited. For example, one apparatus or three or more apparatuses may be used.

Further, a plurality of PCs (personal computers) 21 are connected to the communication line network 20 as an information terminal.

Figure 1B:
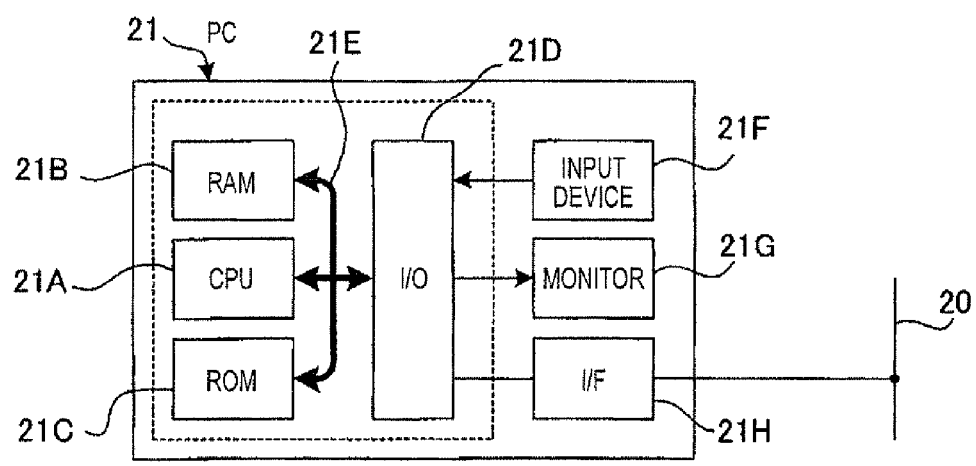

As shown in FIG. 1B, each PC 21 includes a CPU 21A, a RAM 21B, a ROM 21C, an I/O 21D, and a bus 21E such as a data bus or a control bus that connects these components to each other.

An input section 21F such as a keyboard or mouse and a monitor 21G are connected to the I/O 21D. Further, the I/O 21D is connected to the communication line network 20 through an I/F 21H.

In FIG. 1A, two PCs 21 are connected, but the number of the PCs is not limited. For example, one PC or three or more PCs may be used. Further, the information terminal is not limited to the PC 21, and a wired connection should not necessarily be used. That is, a communication line network that transmits or receives information in a wireless manner may be used.

As shown in FIGS. 1A and 1B, in the image processing apparatus 10, there is a case where data is transmitted to the image processing apparatus 10 from the PC 21 in a remote manner, for example, to perform an image forming (print) instruction operation, or a case where a user stands in front of the image processing apparatus 10 and performs a variety of operations to instruct a process such as copy, scanning (image reading) or facsimile transmission or reception, for example.

Figure 2:
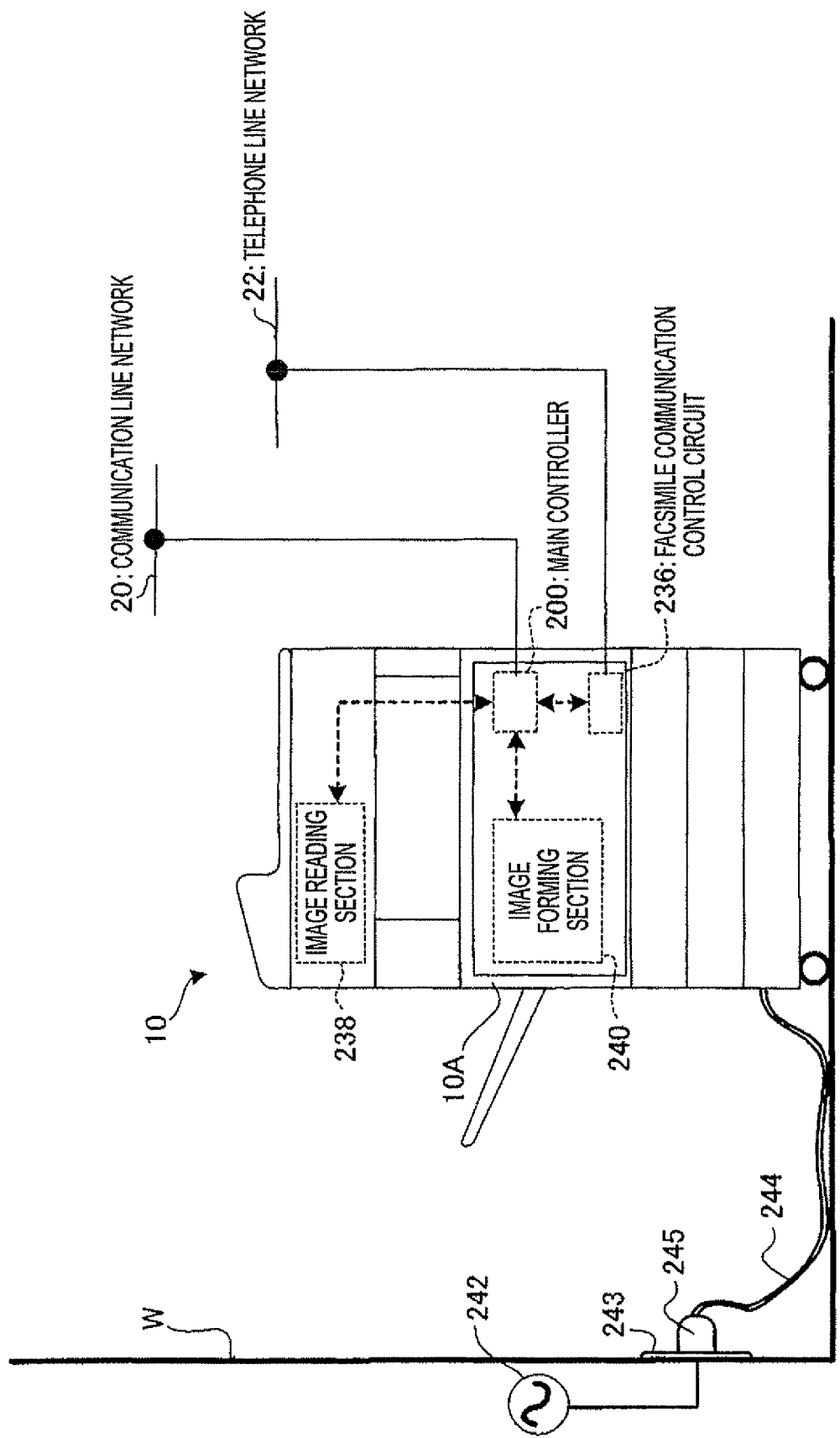
FIG. 2 is a diagram schematically illustrating an image processing apparatus according to the embodiment.

FIG. 2 shows the image processing apparatus 10 according to the embodiment.

The image processing apparatus 10 basically includes an image forming section 240 that forms an image on a recording sheet, an image reading section 238 that reads a document image, and a facsimile communication control circuit 236. The image processing apparatus 10 includes a main controller 200, and controls the image forming section 240, the image reading section 238 and the facsimile communication control circuit 236 to primarily store image data on the document image read by the image reading section 238 or to transmit the read image data to the image forming section 240 or the facsimile communication control circuit 236.

The communication line network 20 such as the Internet is connected to the main controller 200, and a telephone line network 22 is connected to the facsimile communication control circuit 236. For example, the main controller 200 is connected to a host computer through the communication line network 20 to receive image data or to perform facsimile reception and facsimile transmission through the facsimile communication control circuit 236 using the telephone line network 22.

In the image processing apparatus 10, a socket 245 is installed at the tip of an input power supply cable 244, and the socket 245 is inserted in a wiring plate 243 of a commercial power supply 242 wired to a wall surface W. Thus, the image processing apparatus 10 is supplied with electric power from the commercial power supply 242.

Detailed Description of Image Processing Apparatus

Figure 3:
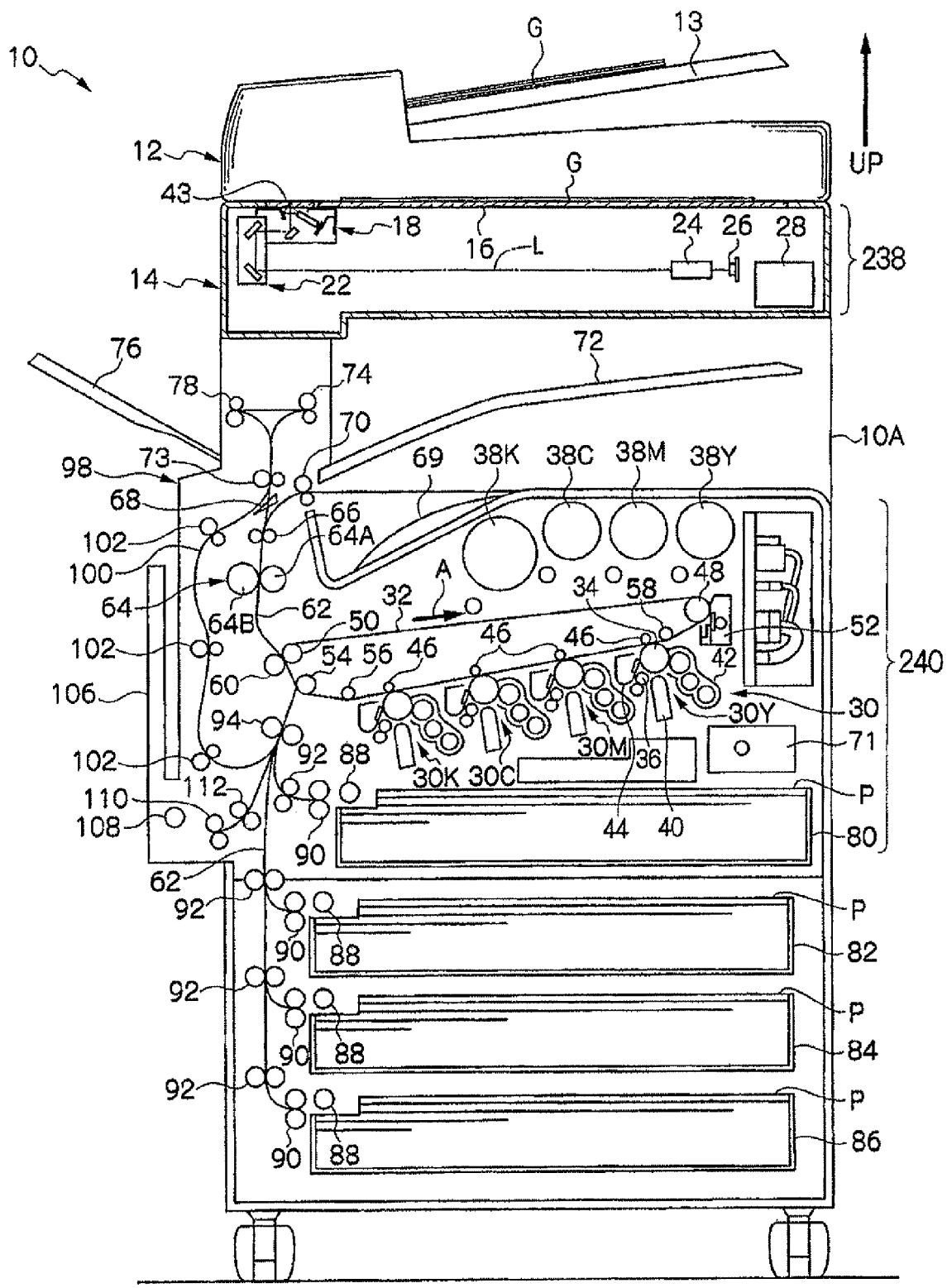
FIG. 3 is a detailed view illustrating an internal configuration of the image processing apparatus according to the embodiment.

As shown in FIG. 3, in an upper part of a main body 10A of the image processing apparatus 10 according to the embodiment, an automatic document transport device 12 that automatically transports a plurality of documents G to be read one by one, a first platen glass 16 on which one document G is loaded, and the image reading section 238 that reads the document G transmitted by the automatic document transport device 12 or the document G loaded on the first platen glass 16 are provided. The automatic document transport device 12 includes a document holder 13 on which the plurality of documents G are loaded.

The image reading section 238 includes a first mirror unit 18 that moves along the document G loaded on the first platen glass 16, and a second mirror unit 22 that reflects an image obtained by scanning in the first mirror unit 18 and guides the result to an imaging device 26 such as a CCD line sensor through a lens 24 (see optical axis L).

The image forming section 240 that includes a plurality of image forming units 30 that form toner images having different colors and are arranged in the state of being inclined with respect to the horizontal direction is provided at a center portion of the main body 10A in the vertical direction. Further, an endless intermediate transfer belt 32 onto which the toner images having different colors formed by the image forming units 30 are transferred while circulating in an arrow direction A in FIG. 3 is provided above the image forming units 30.

As the image forming units 30, four image farming units 30Y, 30M, 30C and 30K of yellow (Y), magenta (M), cyan (C) and black (K) are provided in order.

The image forming unit 30Y basically includes an image support 34, a charging member 36, an exposure device 40, and a developer 42, which is similarly applied to the three image forming units 30M, 30C and 30K, but reference numerals are omitted in FIG. 3.

Toner cartridges 38Y, 38M, 38C and 38K that provide a toner having a predetermined color to the developer 42 of each color of yellow (Y), magenta (M), cyan (C) and black (K) are provided above the intermediate transfer belt 32. Further, the toner cartridge 38K that contains the black (K) toner is larger than the other color toner cartridges since the toner cartridge 38K is frequently used.

On the other hand, on an opposite side of the image support 34 with the intermediate transfer belt 32 being interposed therebetween, a primary transfer member 46 for transferring a toner image formed on the surface of the image support 34 to the intermediate transfer belt 32 is provided. Further, a cleaning device 44 for cleaning the remaining toner or the like that remains on the surface of the image support 34 without being transferred to the intermediate transfer belt 32 from the image support 34 is provided in contact with the surface of the image support 34.

Here, light beams based on image data of the respective colors are sequentially output from the exposure devices 40 that are individually provided in the image forming units 30Y, 30M, 30C and 30K. The light beams expose the surfaces of the image supports of the respective colors that are uniformly charged by the charging members 36, and thus, an electrostatic latent image is formed on the surface of each image support 34. The electrostatic latent image formed on the surface of the image support 34 is developed as a toner image of each color by the developer 42.

The toner images of the respective colors of yellow (Y), magenta (M), cyan (C) and black (K) that are sequentially formed on the surfaces of the image supports 34 are transferred onto the intermediate transfer belt 32 that is disposed to be inclined above the image forming units 30Y, 30M, 30C and 30K of the respective colors in an overlapping manner, by the primary transfer members 46.

The intermediate transfer belt 32 is wound on a drive roller 48 that assigns a driving force to the intermediate transfer belt 32, a support roller 50 that rotates by being driven, a tension roller 54 that assigns a tension to the intermediate transfer belt 32, a first idle roller 56, and a second idle roller 58.

On an opposite side of the drive roller 48 with the intermediate transfer belt 32 being interposed therebetween, a cleaning device 52 that cleans the surface of the intermediate transfer belt 32 is provided.

On an opposite side of the support roller 50 with the intermediate transfer belt 32 being interposed therebetween, a secondary transfer member 60 that secondarily transfers the toner image that is primarily transferred onto the intermediate transfer belt 32 to the recording sheet P is disposed.

Further, above the secondary transfer member 60, a fixing device 64 that fixes the toner image transferred by the secondary transfer member 60 onto the recording sheet P that is transported along a transport path 62 is provided. The fixing device 64 includes a heating roller 64A disposed on the image surface side of the recording sheet P, and a pressing roller 64B that presses the recording sheet P toward the heating roller 64A.

Further, on a downstream side of the fixing device 64 in the transport direction of the recording sheet P, transport rollers 66 are provided, and a switching gate 68 that switches the transport direction of the recording sheet P is provided above the transport rollers 66.

On a downstream side of the switching gate 68 in the transport direction of the recording sheet P, a first discharge roller 70 that discharges the recording sheet P that is guided by the switching gate 68 switched in one direction to a first discharge section 69 is provided.

Further, on another downstream side of the switching gate 68 in the transport direction of the recording sheet P, a second discharge roller 74 that discharges the recording sheet P that is guided by the switching gate 68 switched in the other direction and is transported by transport rollers 73 to a second discharge section 72, and a third discharge roller 78 that discharges the recording sheet P to a third discharge section 76 are provided.

On the other hand, on an upstream side of the secondary transfer member 60 in the transport direction of the recording sheet P, in a lower part of the main body 10A, supply sections 80, 82, 84 and 86 in which the recording sheets P are contained are provided. Further, for example, the recording sheets P having different sizes are contained in the respective supply sections 80, 82, 84 and 86. The recording sheets of the same size may be contained in two or more supply sections of the supply sections 80, 82, 84 and 86, and the direction may be changed by 90° with the same size.

Further, in each of the supply sections 80, 82, 84 and 86, a paper feeding roller 88 that picks up the contained recording sheet P to the transport path 62 from each of the supply sections 80, 82, 84 and 86 is provided, and on a downstream side of the paper feeding roller 88 in the transport direction, transport rollers 90 and transport rollers 92 that transport the recording sheet P one by one are provided.

Further, on a downstream side of the transport roller 92 in the transport direction, positioning rollers 94 that temporarily stop the recording sheet P and transmit the sheet to a secondary transfer position at a predetermined timing are provided.

On the other hand, in order to form images on both sides of the recording sheet P, a duplex transport unit 98 that reverses and transports the recording sheet P is provided beside the secondary transfer position. In the duplex transport unit 98, a reversal path 100 to which the recording sheet P transported as the transport rollers 73 are reversed is sent is provided. Further, a plurality of pairs of transport rollers 102 are provided along the reversal path 100, and the recording sheet P transported by these transport rollers 102 is re-transported to the positioning rollers 94 with two sides thereof being reversed.

Further, on the outside of the apparatus with reference to the duplex transport unit 98, a folder-type manual paper feeding section 106 is provided. In a lower part of the duplex transport unit 98, a paper feeding roller 108 and transport rollers 110 and 112 that transports the recording sheet P that is supplied from the folder-type manual paper feeding section 106 that is in a usage state are provided, and the recording sheet P transported by the transport rollers 110 and 112 is to be transported to the positioning rollers 94.

Configuration of Control System Hardware of Image Processing Apparatus

Figure 4:
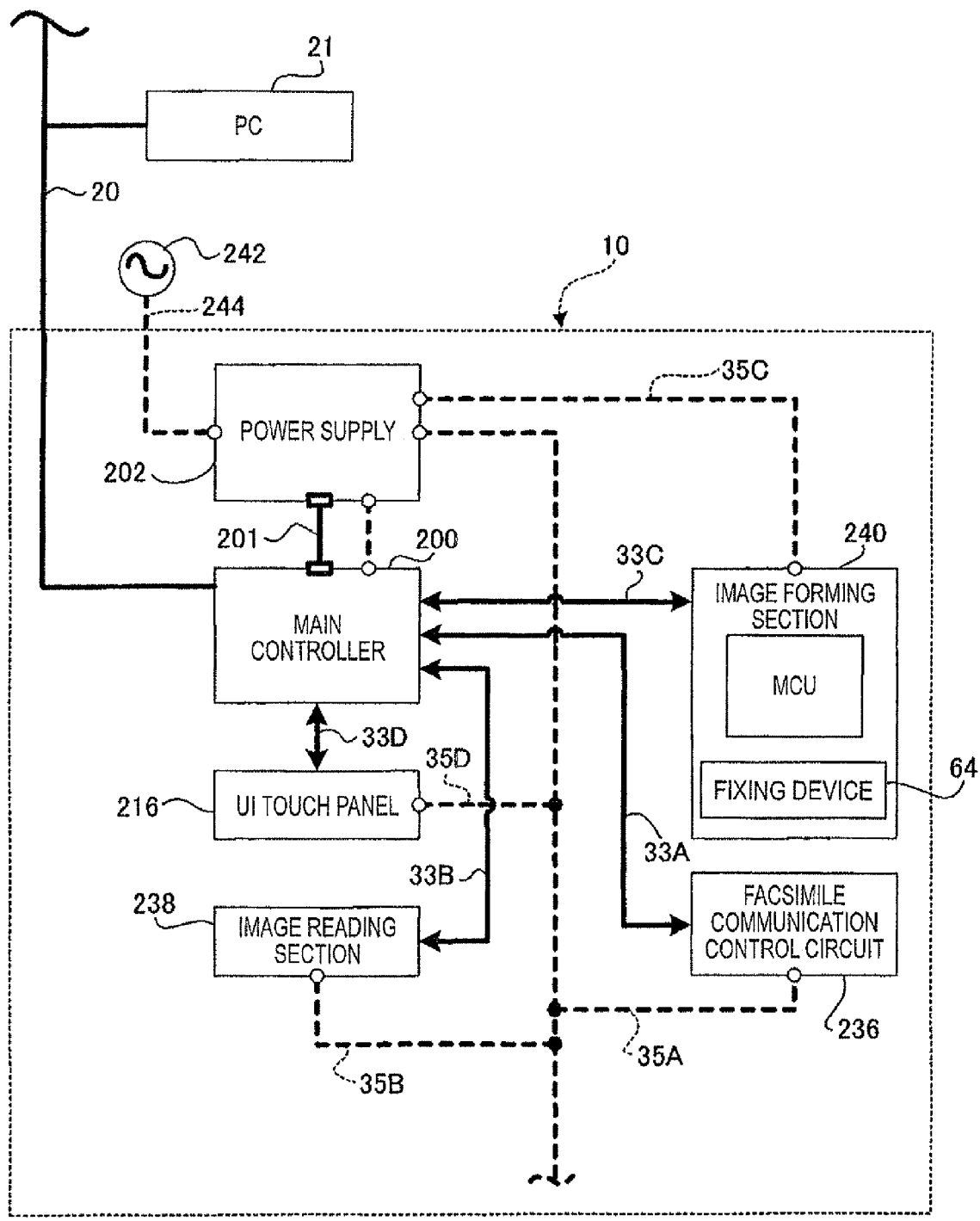
FIG. 4 is a block diagram illustrating a configuration of a control system of the image processing apparatus according to the embodiment.

FIG. 4 is a diagram schematically illustrating a hardware configuration of a control system of the image processing apparatus 10.

The communication line network 20 is connected to the main controller 200. The facsimile communication control circuit 236, the image reading section 238, the image forming section 240 and the UI touch panel 216 are respectively connected to the main controller 200 through buses 33A to 33D such as a data bus or a controller bus. That is, the main controller 200 controls the respective processing sections of the image processing apparatus 10. A backlight section for the UI touch panel 216 may be installed in the UI touch panel 216.

Further, the image processing apparatus 10 includes a power supply 202, and is connected to the main controller 200 through a signal harness 201.

The power supply 202 is supplied with electric power through the input power supply cable 244 from the commercial power supply 242.

In the power supply 202, power supply lines 35A to 35D that respectively supply electric power to the main controller 200, the facsimile communication control circuit 236, the image reading section 238, the image forming section 240, and the UI touch panel 216 that respectively includes an independent CPU are provided. In the main controller 200, a so-called partial power-saving control in which the power supply is individually performed (power supply mode) or the power cut-off is individually performed (sleep mode) with respect to the respective processing sections (devices) may be performed. A control system that includes the CPU of the image forming unit 240 may be referred to as an MCU.

Further, a motion sensor may be provided in the main controller 200 to monitor the presence or absence of a human around the image processing apparatus 10 or to perform the power supply control.

Next, the fixing device 64 (Fuser) according to the embodiment will be described. In the embodiment, a heat resisting temperature of the fixing device 64 is set to 240° C., and a fixing setting temperature is set to 370° C.

Figure 5:
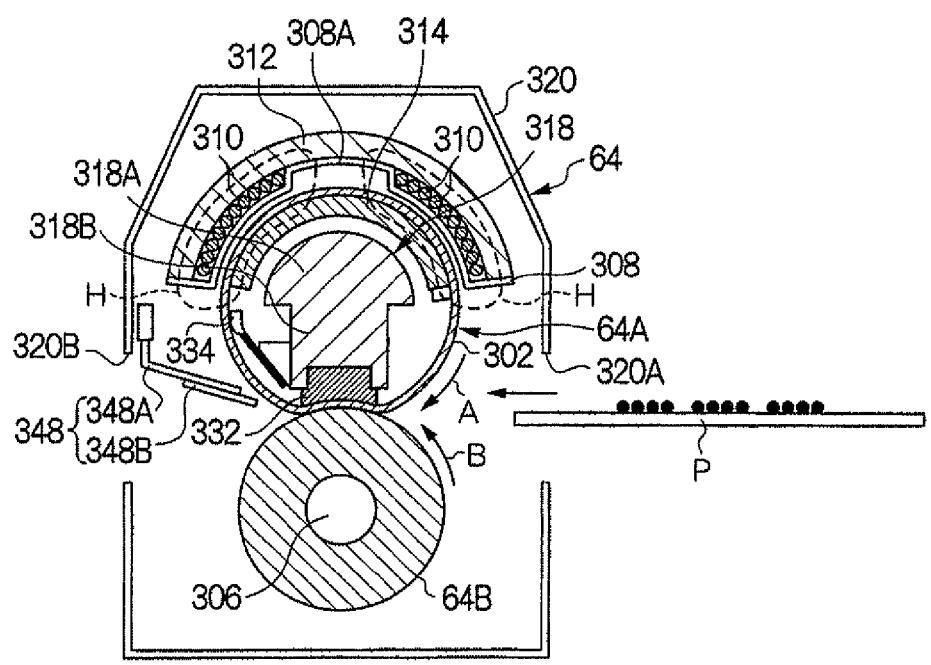
FIG. 5 is a cross-sectional view illustrating a fixing device according to the embodiment.

As shown in FIG. 5, the fixing device 64 includes a casing 320 in which openings 320A and 320B for entrance or discharge of the recording sheet P are formed. Inside the casing 320, an endless fixing belt 302 is provided, which forms an outer circumference of the heating roller 64A. In opposite end portions of the fixing belt 302, a cap member (not shown) including a rotation shaft of a circular shape is fixedly fit, and the fixing belt 302 is rotatably supported around the rotation shaft. Further, a gear connected to a motor (not shown) that drives the fixing belt 302 to rotate is coupled to one cap member. Here, if the motor is operated, the fixing belt 302 rotates in an arrow direction A in FIG. 5.

In a position that faces an outer circumferential surface of the fixing belt 302, a bobbin 308 that is formed of an insulating material is disposed. The bobbin 308 is formed in an approximately arc shape along the outer circumferential surface of the fixing belt 302, and a convex portion 308A protrudes from the approximate center of the surface thereof that is opposite to the fixing belt 302. An interval between the bobbin 308 and the fixing belt 302 is set to about 1 to 3 mm.

An exciting coil 310 that generates a magnetic field H by electric conduction is wound around the convex 308A in the axis direction (depth direction of the plane of FIG. 5) by a plurality of turns in the bobbin 308. In a position that faces the exciting coil 310, a magnetic core 312 formed in an approximately arc shape along the arc shape of the bobbin 308 is disposed, and is supported by the bobbin 308 or the exciting coil 310.

Inside the fixing belt 302, a thermosensitive magnetic member 314 of an approximately arc shape that is in contact with an inner circumferential surface of the fixing belt 302 is provided along the fixing belt 302. The thermosensitive magnetic member 314 is disposed to face the exciting coil 310. The thermosensitive magnetic coil 314 may be referred to as a "heat storage member" due to its heat storage function.

Inside the thermosensitive magnetic coil 314, an inductor 318 made of aluminum is provided. It is preferable that the inductor 318 have a thickness of the skin depth or more and be made of a non-magnetic metal having a small specific resistance. The material thereof is preferably silver, copper or aluminum. The inductor 318 includes an arc portion 318A that faces the inner circumferential surface of the thermosensitive magnetic coil 314 and a pillar portion 318B that is integrally formed with the arc portion 318A, and opposite ends thereof are fixed to the casing 320 of the fixing device 64.

Further, the arc portion 318A of the inductor 318 is disposed in advance in a position where a magnetic flux of a magnetic field H is induced in a case where the magnetic flux of the magnetic field H penetrates the thermosensitive magnetic coil 314. An interval between the inductor 318 and the thermosensitive magnetic coil 314 is 1 to 5 mm. As described later, the inductor 318 and the thermosensitive magnetic coil 314 are independently supported.

On an end surface of the pillar portion 318B of the inductor 318, a pressing pad 332 for pressing the fixing belt 302 toward the outside by a predetermined pressure is fixedly supported. Thus, it is not necessary to provide members that respectively support the inductor 318 and the pressing pad 332, and it is thus possible to perform miniaturization of the fixing device 64. The pressing pad 332 is made of an elastic member such as urethane rubber or sponge, and has one end surface that is in contact with the inner circumferential surface of the fixing belt 302 to press the fixing belt 302.

With the outer circumferential surface of the fixing belt 302, the pressing roller 64B that is driven to rotate with respect to the rotation of the fixing belt 302 in an arrow direction B in FIG. 5 (direction opposite to the arrow direction A of FIG. 5) is in contact under pressure.

The pressing roller 64B has a configuration in which a foaming silicon rubber sponge elastic layer of a thickness of 5 mm is provided around a core bar 306 made of a metal such as aluminum and a mold release layer made of PFA containing carbon of a thickness of 50 μm is coated on the outside of the foaming silicon rubber sponge elastic layer. Further, the pressing roller 6413 is in contact with or is spaced from the outer circumferential surface of the fixing belt 302 by a retract mechanism in which a bracket (not shown) that rotatably supports the pressing roller 64B swings by a cam.

Inside the fixing belt 302, in a region that does not face the exciting coil 310 and in a region on the discharge side of the recording sheet P, a thermistor 334 that measures the temperature of the inner circumferential surface of the fixing belt 302 is disposed in contact with the fixing belt 302. The thermistor 334 measures the surface temperature of the fixing belt 302 by calculating temperature from a resistance value changed according to the quantity of heat given from the fixing belt 302. A contact position of the thermistor 334 is the approximate center of the fixing belt 302 in the width direction so that the measured value is not changed according to the size of the recording sheet P.

The thermistor 334 is connected to the MCU (see FIG. 4) of the image forming section 240. The MCU performs the temperature calculation on the basis of the amount of electricity transmitted from the thermistor 334 to measure the temperature of the surface of the fixing belt 302. Further, the measured temperature is compared with a fixing setting temperature (for example, 370° C.) that is stored in advance, and if the measured temperature is lower than the fixing setting temperature, the exciting coil 310 is electrically conducted to generate the magnetic field H (see FIG. 5) as a magnetic circuit. If the measured temperature is higher than the fixing setting temperature, the electric conduction is stopped.

In the vicinity of the downstream side of a contact portion (nip portion) between the fixing belt 302 and the pressing roller 64B in the transport direction of the recording sheet P, a release member 348 is provided. The release member 348 includes a support portion 348A of which one end is supported, and a release sheet 348B that is supported by the supporting portion 348A. The tip end of the release sheet 348B is disposed to be close to or in contact with the fixing belt 302.

Next, a contact/non-contact mechanism to the fixing belt 302 of the thermosensitive magnetic coil 314 will be described.

Here, as a fixing mode of the fixing device 64, a fixing process in a state where the thermosensitive magnetic coil 314 is in contact with the fixing belt 302 is referred to a "heat storage mode", a fixing process in a state where the thermosensitive magnetic coil 314 is spaced from the fixing belt 302 is referred to as a "fast heating mode". Specifications of the respective fixing modes will be described later.

Figure 6:
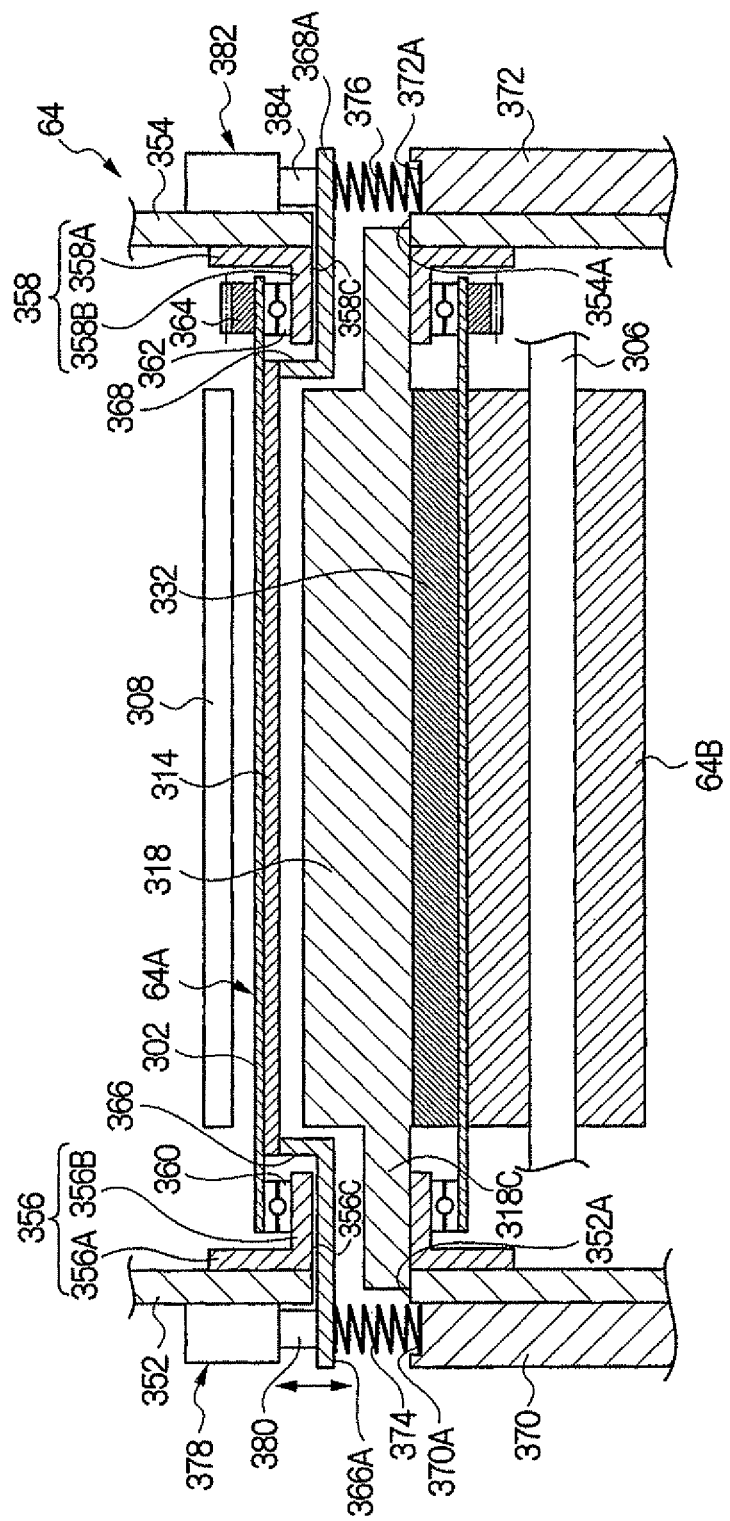
FIG. 6 is a cross-sectional view illustrating a contact/non-contact mechanism section of the fixing device according to the embodiment.

As shown in FIG. 6, inside the fixing device 64, a pair of side plates 352 and 354 is vertically provided with opposite end portions of the fixing belt 302 and the pressing roller 64B being interposed therebetween. In positions that face the opposite end portions of the fixing belt 302, through holes 352A and 354A that are smaller than an inner diameter of the fixing belt 302 are formed in the side plates 352 and 354.

Further, on inner walls of the side plate 352 and the side plate 354, support sections 356 and 358 are respectively provided by fixing means such as a screw (not shown). The support member 356 includes a flat plate portion 356A that is supported by the side plate 352, a cylindrical shaft 356B that protrudes from the flat plate portion 356A, and a through hole 356C that passes through the flat plate portion 356A and the shaft 356B.

Similarly, the support member 358 includes a flat plate portion 358A that is fixed to the side plate 354, a cylindrical shaft 358B that protrudes from the flat plate portion 358A, and a through hole 358C that passes through the flat plate portion 358A and the shaft 358B.

The through hole 352A and the through hole 356C have the same diameter, and are in a communication state where inner circumferential walls thereof coincide with each other. Similarly, the through hole 354A and the through hole 358C have the same diameter, and are in a communication state where inner circumferential walls thereof coincide with each other.

A bearing 360 is fixedly engaged with the shaft 356B, and a bearing 362 is fixedly engaged with the shaft 358B. Here, the outer diameters of the bearings 360 and 362 are approximately the same as that of the fixing belt 302, and the inner circumferential surfaces of the opposite end portions of the fixing belt 302 are fixedly attached to the outer circumferential surfaces of the bearings 360 and 362. Thus, the fixing belt 302 is able to rotate the centers of the shafts 356B and 358B as a rotation center.

On the side of the shaft 358B, on the outer circumferential surface of one end of the fixing belt 302, a gear 364 for rotation driving is provided. The gear 364 is driven by a motor (not shown).

On the other hand, to each of the opposite end portions of the thermosensitive magnetic coil 314, each end of support members 366 and 368 having a cross section of an approximately L shape is attached. On the other end sides of the support members 366 and 368, a flat plate portion 366A and a flat plate portion 368B are formed. The support members 366 and 368 are formed of a member having low thermal conductivity, and are configured so that the heat of the thermosensitive magnetic coil 314 is not transferred to the support members 366 and 368 as it is.

The flat plate portion 366A is inserted into the through hole 356C and the through hole 352A to protrude to the outside from the side plate 352. Similarly, the flat plate portion 368A is inserted into the through hole 358C and the through hole 354A to protrude to the outside from the side plate 354.

Under the flat plate portion 366A, a base 370 having a wide width in which a concave portion 370A is formed on an upper surface thereof is provided. The base 370 is fixed to an outer wall of the side plate 352. Further, the concave portion 370A is positioned to face an end portion of the flat plate portion 366A of the support member 366.

Similarly, under the flat plate portion 368A, a base 372 having a wide width in which a concave portion 372A is formed on an upper surface thereof is provided. The base 372 is fixed to an outer wall of the side plate 354. Further, the concave portion 372A is positioned to face an end portion of the flat plate portion 368A of the support member 368.

Here, one end of a coil spring 374 is fixed to the concave portion 370A, and the other end of the coil spring 374 is fixed to the lower surface of the flat plate portion 366A. Similarly, one end of a coil spring 376 is fixed to the concave portion 372A, and the other end of the coil spring 376 is fixed to the lower surface of the flat plate portion 368A. Thus, the thermosensitive magnetic coil 314 is supported to be able to move in a vertical direction.

As shown in FIG. 6, the thermosensitive magnetic coil 314 is in contact with the inner circumferential surface of the fixing belt 302 in a state (position) where the coil springs 374 and 376 expand. Thus, the fixing belt 302 is not deformed to the outside by the thermosensitive magnetic coil 314.

In a position that faces the coil spring 374 above the flat plate portion 366A, an electric cylinder 378 is provided. The electric cylinder 378 has an actuator 380 that expands or contracts on one side thereof, in which the actuator 380 is downwardly fixed to the outer wall of the side plate 352.

Similarly, in a position that faces the coil spring 376 above the flat plate portion 368A, an electric cylinder 382 is provided. The electric cylinder 382 has an actuator 384 that expands or contracts on one side thereof, in which the actuator 384 is downwardly fixed to the outer wall of the side plate 354.

The actuator 380 has one end that is in slight contact with the upper surface of the flat plate portion 366A in a short state of being contracted. Similarly, the actuator 384 has one end that is in slight contact with the upper surface of the flat plate portion 368A in a short state of being contracted. Both the electric cylinders 378 and 382 are configured so that the expansion operations of the actuators 380 and 384 are performed by solenoid driving, motor driving or the like. Here, it is also possible to use an air cylinder or a hydraulic cylinder in which the actuators 380 and 384 are expanded and contracted by opening and closing a solenoid valve by electric control.

Figure 7A:
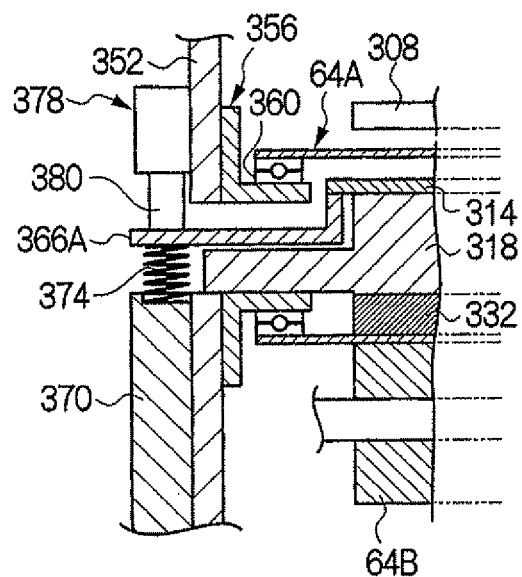

Here, in the embodiment, in a case where the fixing mode is the "fast heating mode", the MCU of the image forming section 240 expands the actuators 380 and 384, as shown in FIG. 7A, to control the operations of the electric cylinders 378 and 382, to thereby contract the coil springs 374 and 376. Thus, as shown in FIG. 7B, the thermosensitive magnetic coil 314 and the fixing belt 302 are maintained in the state of being spaced from each other.

Figure 7C:
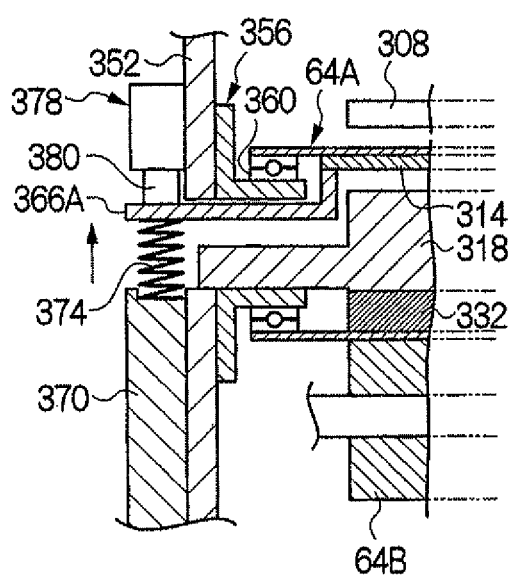
Figure 7B:
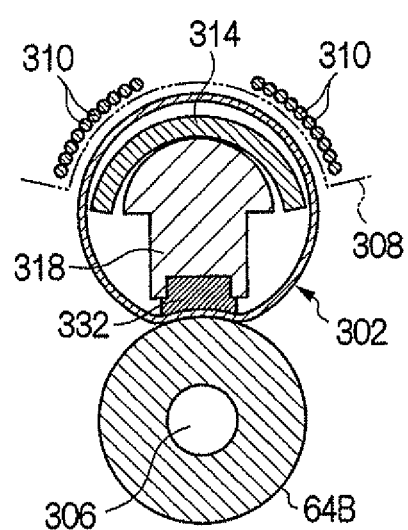
Figure 7D:
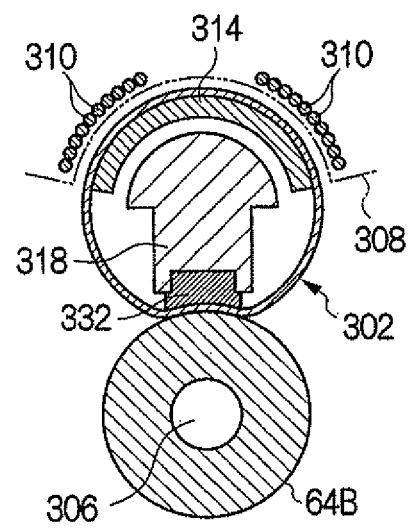

On the other hand, as shown in FIG. 7C, in a case where the fixing mode is the "heat storage mode", the MCU of the image forming section 240 controls the operations of the electric cylinders 378 and 382 so that the actuators 380 and 384 are contracted to expand the coil springs 374 and 376. Thus, as shown in FIG. 7D, the thermosensitive magnetic coil 314 and the fixing belt 302 are maintained in the state of being in contact with each other.

Basic Specification of Fixing Device 64
Process Type 1

The fixing device according to the embodiment includes the "fast heating mode" and the "heat storage mode" as a mode (fixing mode) in which the fixing process is performed, and basically, the mode is selectively switched according to the number of image forming processes.

Table 1 is a comparison table of the "fast heating mode" and the "heat storage mode". As understood from Table 1, when all processing times are compared with each other, the "fast heating mode" is suitable for a small-scale process of one sheet to several sheets (hereinafter, MAX is referred to as "N"), and the "heat storage mode" is suitable for a large-scale process of sheets exceeding N. The number of processing sheets N that is a boundary for selection of the fixing mode is changed according to the specification of the image processing apparatus 10.

TABLE 1

| Fixing mode | Relationship between fixing belt and heat storage member | FPOT (FCOT) | Throughput | Surplus power |
|---|---|---|---|---|
| Fast heating mode | Spaced (Non-contact) | Fast (3 to 6 sec) | Slow (20 to 35 ppm) | Non-existence |
| Heat storage mode | Contact | Slow (13 to 32 sec) | Fast (40 to 80 ppm) | Existence |

"Fast" and "Slow" in Table 1 represents a relative relationship between the modes, and numerical values in the brackets are only examples.

Fixing Mode Switching Control

Here, in a case where the number of image processing sheets in one job is already known, it may be considered that the fastest fixing mode for processing the entire number of processing sheets is selected. For example, it is possible to set a process of one sheet (FPOT (FCOT) in Table 1) to the fastest mode (fast heating mode), and then, to determine whether the number of processing sheets is N sheets or more as the boundary and to select and switch the fixing mode of the fixing device 64 as necessary.

That is, if the final number of processing sheets is already known, the fixing mode may be selected as the fast heating mode or the heat storage mode according to whether the following arithmetic expression is established or not.

$$a+(60/x) \times c < b+(60/w) \times c \quad (1)$$

In the arithmetic expression (1), the inequality sign is used as "<", but "≤" may be used.

Here, x: the number of processing sheets per unit time (60 seconds) in fast heating mode w: the number of processing sheets per unit time (60 seconds) in heat storage mode c: the number of image processing sheets ft1: time from image processing instruction to the start of image processing operation on initial recording sheet in fast heating mode ft2: time from image processing instruction to the start of image processing operation on initial recording sheet in heat storage mode 60/x: image processing time per recording sheet in fast heating mode 60/w: image processing time per recording sheet in heat storage mode a: warming-up time in fast heating mode b: warming-up time in heat storage mode based on initial values including temperature of thermosensitive magnetic coil 314 (heat storage member)

In a case where the arithmetic expression (1) is established, the fast heating mode is selected, and in a case where the arithmetic expression (1) is not established, the heat storage mode is selected.

Figure 8:
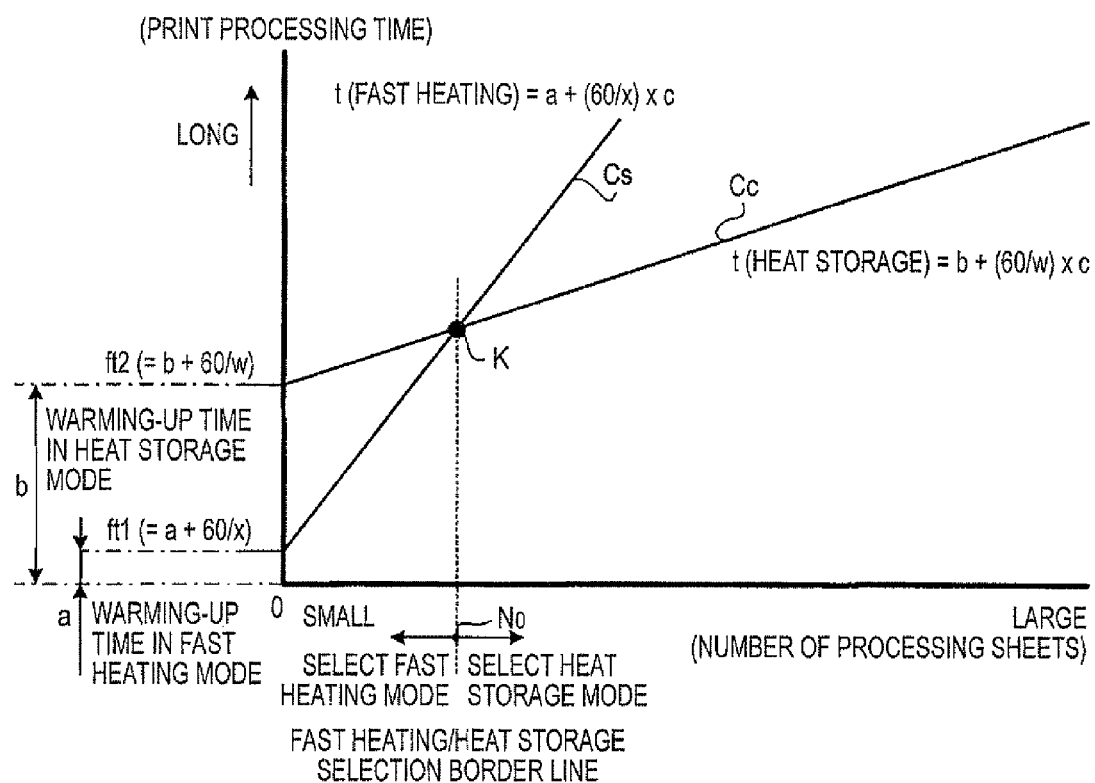
FIG. 8 is a characteristic diagram illustrating a characteristic curve of the number of processed sheets to the processing time in a fast heating mode and a heat storage mode according to the embodiment.

FIG. 8 is a characteristic diagram illustrating the correlation of the fast heating mode and the heat storage mode, in which the transverse axis represents the number of processing sheets and the longitudinal axis represents time.

As shown in FIG. 8, a fast heating mode characteristic curve Cs maintains a characteristic of an approximately direct proportion with an inclination depending on "60/x" after a warming-up time (a) elapses from an image processing instruction. Here, the "approximately direct proportion" refers to the relationship of a logically direct proportion that includes a case where the straight line is bent due to error factors including machine difference, temperature change and transport accuracy.

On the other hand, as shown in FIG. 8, the heat storage mode characteristic curve Cc maintains a characteristic of an approximately direct proportion with an inclination depending on "60/w" after a warming-up time (b) elapses from the image processing instruction. Here, the "approximately direct proportion" refers to the relationship of a logically direct proportion that includes a case where the straight line is bent due to error factors including machine difference, temperature change and transport accuracy.

In FIG. 8, since the number of processing sheets is represented by the transverse axis, and time is represented by the longitudinal axis, as the inclination is relatively large, the time taken for the processing is long. Accordingly, the fast heating mode characteristic curve Cs is in inclination larger than the heat storage mode characteristic curve Cc.

Since the respective inclinations "60/x" and "60/w" are different from each other, the fast heating mode characteristic curve Cs and the heat storage mode characteristic curve Cc intersect with each other at a certain time. The intersection point (point K in FIG. 8) becomes a border line (the number of processing sheets NO) for determining whether the fixing mode is set to the fast heating mode or the heat storage mode.

For example, if Table 1 is further specified (numerical values are specified) to be calculated as in the following Table 2, about 30 sheets are obtained.

TABLE 2

| Fixing mode | Relationship between fixing belt and heat storage member | FPOT (FCOT) | Throughput | Surplus power |
|---|---|---|---|---|
| Fast heating mode | Spaced (Non-contact) | Fast (4.71 sec) | Slow (35 ppm) | Non-existence |
| Heat storage mode | Contact | Slow (30.80 sec) | Fast (75 ppm) | Existence |

In other words, in a case where the total number of processing sheets is already known, the fast heating mode is selected up to 30 sheets, on the basis of the arithmetic expression (1), and the heat storage mode is selected from 31 sheets.

In the process type 1, the selection of the fixing mode is performed on the assumption that the fixing mode is not changed up to the end of the process after any one of the fast heating mode and the heat storage mode is selected.

Process Type 2

In the process type 1, in a case where the total number of processing sheets is 31 or more, in order to shorten the final end time without consideration of FCOT, the FCOT is set to 30.80 sec.

For example, if the total number of processing sheets is 100 and corresponds to 5 pages×20 sets, after the first 5 pages are output at the fastest speed, the same images (including documents) are repeated after 6 pages.

Thus, in the process type 2, in a case where the image-formed document is confirmed in front of the image processing apparatus 10, the fast heating mode is selected as an initial process in which the FCOT is shortened to festinate the output of at least the first 5 pages, and then, the mode is switched into the heat storage mode as a continuous process. In this case, the switching time is important.

Here, the number of processing sheets of one set is firstly confirmed by a manual operation, an automatic search or the like. Then, the first set is output in the fast heating mode, and then, the mode is switched into the heat storage mode to output the second set and sets thereafter.

Process Type 3

As the fixing mode, there are three types of patterns including "fast heating mode only", "heat storage mode only" and "fast heating mode switched into heat storage mode". Thus, for example, by inputting necessary condition information using the UI touch panel 216, simulations in respective patterns are performed, and pattern selection information is visually reported to a user.

The condition information includes throughput per unit time (the number of processing sheets per minute), time for processing one sheet, warming-up time, time for first sheet output, necessary fixing temperature, time for mode switching, the total number of processing sheets, temperature arrival time from the fast heating mode to the heat storage mode in a non-processing state, and the like.

The selection information includes the number of processing sheets in the fast heating mode, the number of processing sheets in the heat storage mode, real image forming time in the fast heating mode, real image forming time in the heat storage mode, real image forming time in the fast heating mode and the heat storage mode, the total processing time from the fast heating mode to the heat storage mode, the total processing time in the heat storage mode only, and the total processing time in the fast heating mode only, and the like.

TABLE 3

| Condition information 1 | Fast heating mode | Heat storage mode |
|---|---|---|
| Throughput per unit time | x ppm | w ppm |
| Time for processing one sheet | 60/x sec | 60/w sec |
| Warming-up time | a sec | b sec |
| Time for first sheet output | ft1 sec | ft2 sec |
| Necessary fixing temperature | Ts ° C. | Tc ° C. |

| Condition information 2 | Common in fast heating/heat storage |
|---|---|
| Time for mode switching | y sec |
| Total number of processing sheets | c sheets |
| Temperature arrival time from fast heating mode to heat storage mode in non-processing state | z sec |

TABLE 4

| Selection information | Simulation result |
|---|---|
| Number of processing sheets in fast heating mode | $xz/60 \leq c \rightarrow xz/60$ sheets<br>$xz/60 > c \rightarrow c$ sheets |
| Number of processing sheets in heat storage mode | $xz/60 \leq c \rightarrow c-xz/60$ sheets<br>$xz/60 > c \rightarrow 0$ sheet |
| Real image forming time in fast heating mode and heat storage mode (fast heating mode) | $xz/60 \leq c \rightarrow z$ sec<br>$xz/60 > c \rightarrow 60c/x$ sec |
| Real image forming time in fast heating mode and heat storage mode (heat storage mode) | $xz/60 \leq c \rightarrow (60c-xz)/w$ sec<br>$xz/60 > c \rightarrow 0$ sec |
| Real image forming time in heat storage mode | $60/w \times c$ sec |
| Real image forming time in fast heating mode | $60/x \times c$ sec |
| Total processing time from fast heating mode to heat storage mode | $xz/60 \leq c \rightarrow a + z + y + 60/w \times c$ sec<br>$xz/60 > c \rightarrow a + 60/x \times c$ sec |
| Total processing time in heat storage mode only | $b + 60/w \times c$ sec |
| Total processing time in fast heating mode only | $a + 60/x \times c$ sec |

The condition information table shown in Table 3 is illustrated by all variable signs, but as the image processing apparatus 10 that is mounted is specified, at least throughputs per unit time x ppm and w ppm, time for processing one sheet "60/x sec" and "60/w sec", necessary fixing temperatures Ts° C. and Tc° C., and time for mode switching y sec become fixed values.

Further, it is possible to confirm time ft1 sec and ft2 sec for output of the first sheet and time y see for mode switching, according to the situation of the image processing apparatus 10.

Figure 9:
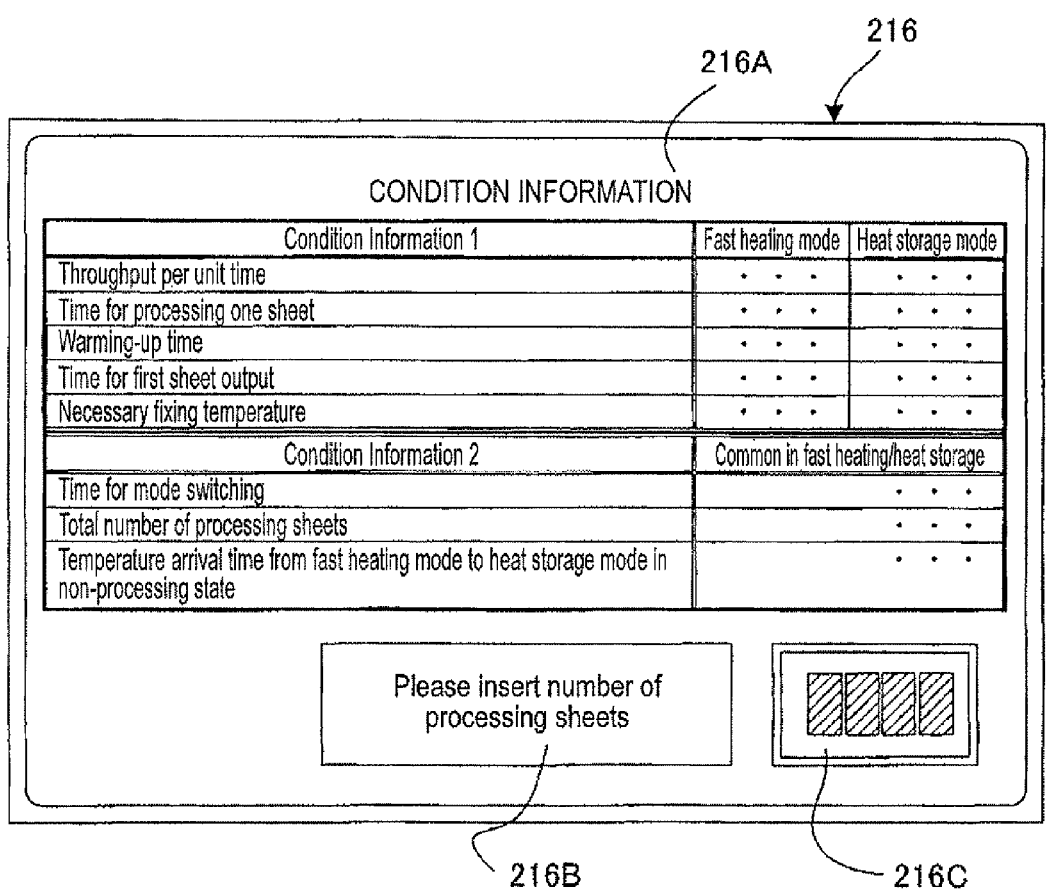
FIG. 9 is a front view when a condition information display screen is displayed on an UI touch panel according to the embodiment.

Thus, in a case where a simulation mode is selected, a condition information display screen 216A is displayed on a display surface of the UI touch panel 216 (or a monitor of the PC 21, if remote), as shown in FIG. 9. In a lower portion of the condition information display screen 216A, specific numerical values of respective items shown in Table 3 are displayed, and also an input instruction screen 216B for promoting input of the number of processing sheets and a processing sheet number input section screen 216C are provided.

The user is able to basically input the number of processing sheets, and inputs the number of processing sheets using a numerical keypad or the like.

Figure 10:
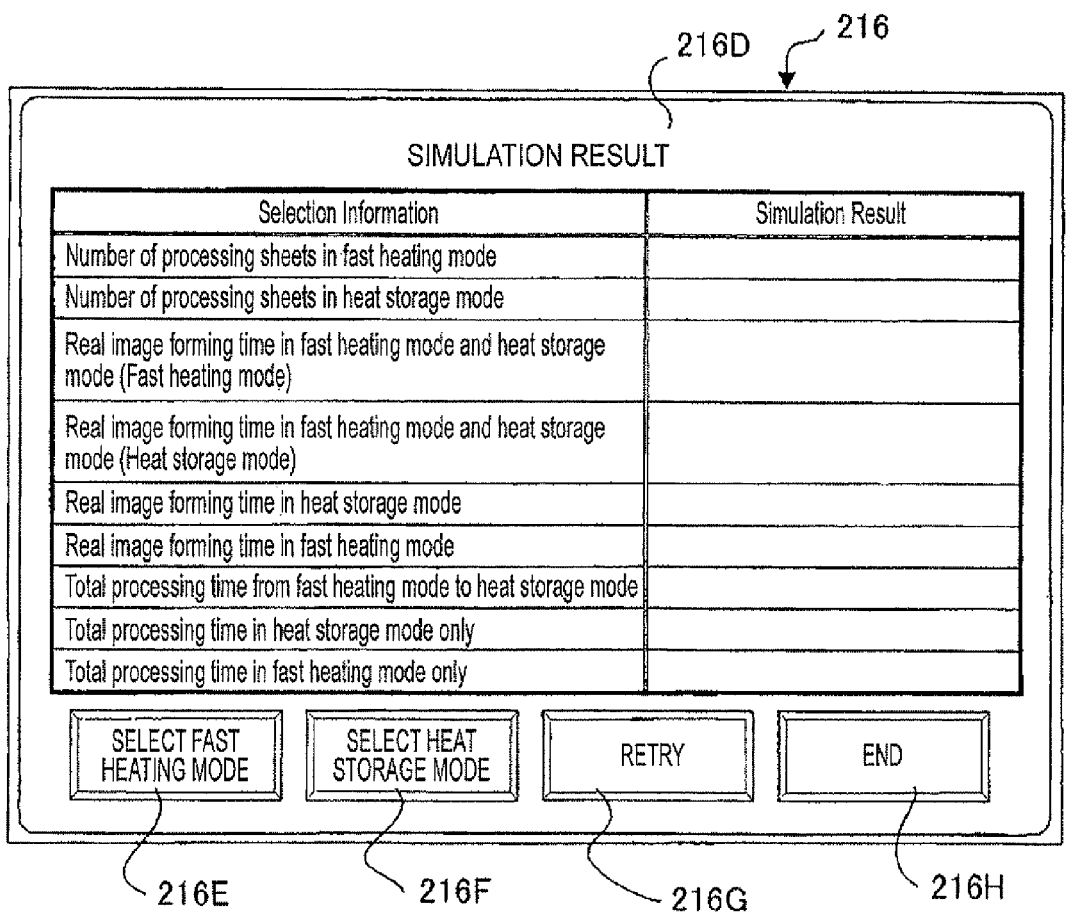
FIG. 10 is a front view when a simulation result display screen is displayed on the UI touch panel according to the embodiment.

If the number of processing sheets is completely input, as shown in FIG. 10, a simulation result display screen 216D is displayed. On the simulation result display screen 216D, items shown in Table 4 are displayed. The number of processing sheets in the fast heating mode and the number of processing sheets in the heat storage mode are displayed by optimal numerical values (distribution in which the processing time is the shortest) based on the number of processing sheets, but this may be changed by the user.

The user confirms the total processing time from the fast heating mode to the heat storage mode, the total processing time in the heat storage mode only and the total processing time in the fast heating mode only and uses the result as determination information about which mode the subsequent process is performed in. Thus, under the simulation result display screen 216D, a fast heating mode selection button 216E, a heat storage mode selection button 216F, a retry button 216G and an end button 216H are displayed.

Process Type 4

On the other hand, in a case where the number of processing sheets is already known, it is not possible to perform determination using the arithmetic expression (1).

Thus, in the embodiment, a control for switching the fixing mode for a job in which the number of processing sheets is not already known is established by comprehensively determining advantages and disadvantages of the fast heating mode and the heat storage mode shown in Table. 1.

Types of Job

In the image processing apparatus 10, copy or remote printing is representative of a job that performs the process using the image forming section 240, and in addition, "anywhere printing" is used as an on-demand process, for example.

The "copy" is a process in which a document image (document G to be read) is read by the image reading section 238 and the read image is formed onto the recording sheet P by the image forming section 240.

If the copy process is performed after waiting for reading the document G, the total throughput (the number of processing sheets N) is determined from the designated number of sets or the like, but in this case, if the amount of read documents G is large, the FCOT tends to be long.

Thus, the image forming process is typically performed together with the image reading process. Thus, it is not determined whether the fast heating mode or the heat storage mode is suitable as the fixing mode.

In the "remote printing", image information and a printing type (the number of pages, the number of sets, N-up and the like) is received according to an instruction from a printer driver installed in the PC 21 or the like, and thus, it is possible to recognize the number of processing sheets N from the printing type. Accordingly, it is determined whether the fast heating mode or the heat storage mode is suitable as the fixing mode before the start of the image forming process.

In the "anywhere printing", the user outputs the image information stored in the PC 21, the server or the like, for example, using the image processing apparatus 10 that is present in the vicinity of the printing place. Here, the user operates the UI touch panel 216 to receive the image information from the storage device, to thereby start the image formation.

Thus, until the user completely inputs the identification information that specifies the storage device and the printing type, it is not determined whether the fast heating mode or the heat storage mode is suitable as the fixing mode.

In the embodiment, among the representative jobs (copy, remote printing and anywhere printing), in the job (remote printing) in which it is determined whether the fast heating mode is suitable as the fixing mode or the heat storage mode is suitable as the fixing mode before the start of the image forming process, the image processing is performed on the basis of the arithmetic expression (1) by switching the mode into the optimal fixing mode from the beginning.

On the other hand, among the representative jobs (copy, remote printing and anywhere printing), in the job (copy, anywhere printing) in which it is not determined whether the fast heating mode is suitable as the fixing mode or the heat storage mode is suitable as the fixing mode, the image forming process is started in the fast heating mode as at least an initial process.

Then, the optimal fixing mode (in which the time up to the end of the process is the shortest, for example) is selected on the basis of the total number N of processing sheets that is determined thereafter, to perform a subsequent process. That is, the subsequent process may include a case where the fixing mode (fast heating mode) of the initial process is continued or a case where the mode is switched from the fixing mode (fast heating mode) of the initial process to the heat storage mode as necessary.

Hereinafter, an operation of the embodiment will be described with reference to flowcharts in FIGS. 11 and 12. The flowchart in FIG. 11 (and FIG. 12) includes the above-described process types 1, 2 and 4.

Figure 11:
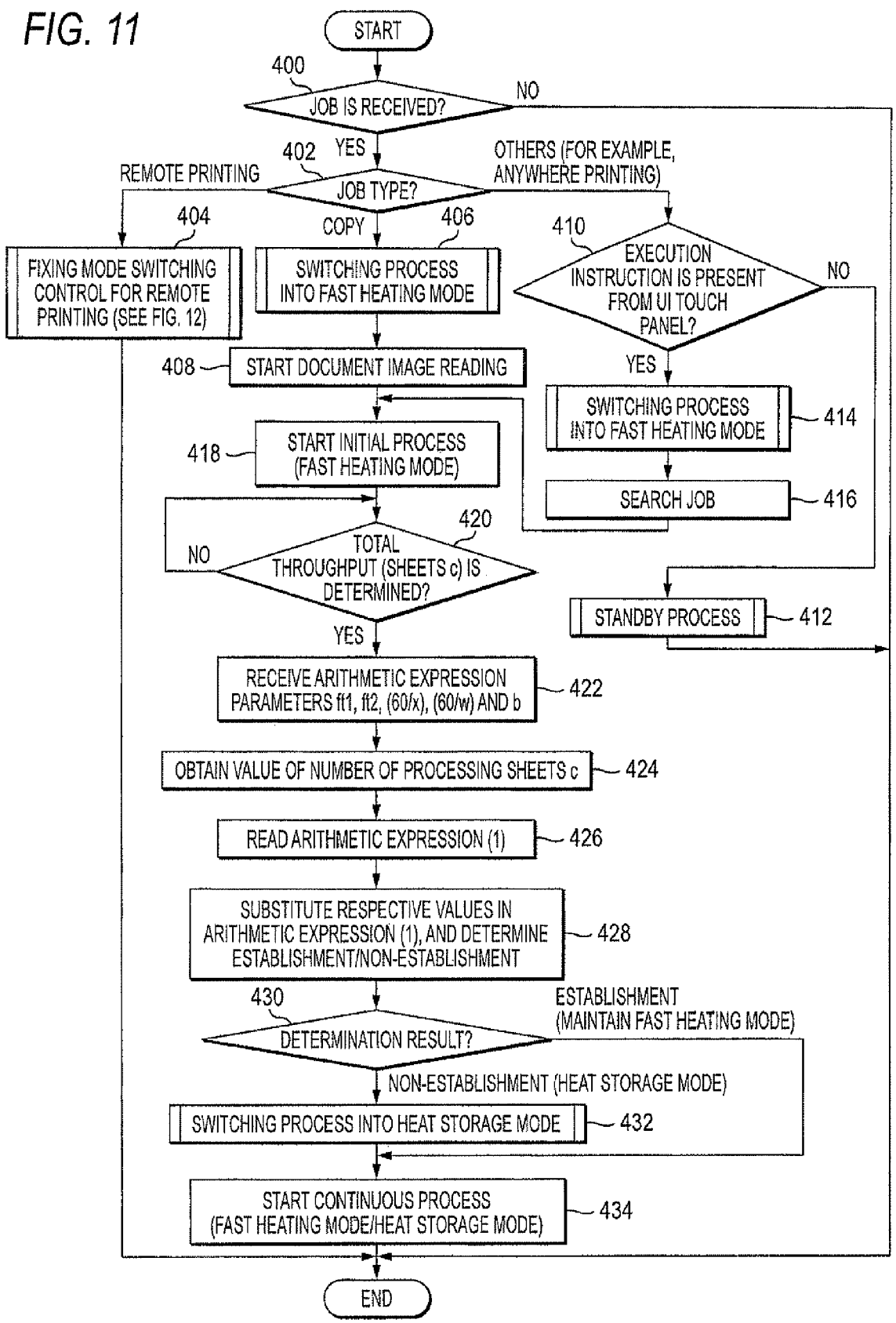
FIG. 11 is a flowchart illustrating a switching control routine of a fixing mode of the fixing device in an image processing control of the image processing apparatus according to the embodiment.

FIG. 11 is a control flowchart mainly illustrating a process until the fixing mode of the fixing device 64 is determined in a so-called sleep state where electric power is not supplied to the fixing device 64.

In step 400, it is determined whether a job is received. If the determination is negative, the sleep state is maintained, and the routine ends.

Further, if the determination is affirmative in step 400, the routine proceeds to step 402 to determine the type (job type) of the received job.

In step 402, if it is determined that the job type is remote printing, it is possible to perform the process type 1 or the process type 2, and the routine proceeds to step 404 to perform a remote printing fixing mode switching control. The remote printing fixing mode switching control will be described later with reference to FIG. 12.

Further, in step 402, if it is determined that the job type is copy, it is possible to perform the process type 4, and the routine proceeds to step 406 to perform the switching process to the fast heating mode.

In a case where the fixing mode is the "fast heating mode", as shown in FIG. 7A, the MCU of the image forming section 240 controls the operations of the electric cylinders 378 and 382 so that the actuators 380 and 384 are expanded to contract the coil springs 374 and 376. Thus, as shown in FIG. 7B, the thermosensitive magnetic coil 314 and the fixing belt 302 are maintained in the state of being spaced from each other.

In the next step 408, reading of the document image is started by the image reading section 238, and then, the routine proceeds to step 418 to start the initial process.

Further, in step 402, in a case where the job type is the anywhere printing mode (on-demand mode) other than the remote printing and copy, for example, it is possible to perform the process type 4, and the routine proceeds to step 410.

In step 410, the user operates the UI touch panel 216 and determines whether an instruction for executing the image forming process in the anywhere printing mode is received.

In a case where the determination is negative in step 410, the routine proceeds to step 412 to perform a standby process, and then, the process ends. Further, as the standby process, it shows to obtain the image information having a large amount of information such as an image.

In step 410, in a case where the user operates the UI touch panel 216 and receives the instruction for executing the image forming process in the anywhere printing mode (affirmative determination), the routine proceeds to step 414 from step 410 to perform the switching process into the fast heating mode, and then proceeds to step 416. In step 416, the corresponding job is searched. Then, the routine proceeds to step 418, and the initial process is started. The job search includes access to a designated PC, a server or the like.

Since the initial process of step 418 has the fixing mode of the fast heating mode, as shown in Table 1, the FCOT is increased to 3 to 6 seconds. However, since this is faster than the heat storage mode, it is possible to perform the image forming process while reading the document image.

In the next step 420, it is determined whether the total throughput (the number of sheets N) is determined on the basis of the number of read document images, the number of sets and the like. If the determination is affirmative, the routine proceeds to step 422.

In step 422, the respective parameters ft1, ft2, "60/x", "60/w" and b in the arithmetic expression is received. These parameters may include a fixed numerical value (invariable) or a value (variable) that varies depending on the environment, and are preferably received for each image processing instruction.

For example, the parameter b represents a warming-up time that varies according to an initial temperature of the thermosensitive magnetic member 314 or the like. Thus, the parameter b may include a case where pre-heating remains due to the previous image processing, a case where the pre-heating does not remain, or a case where the reception time is changed according to change in the initial temperature due to the environment temperature.

The parameters ft1 and ft2 correspond to FCOT determined by the temperature at the process start time of the fixing device 64. Thus, an allowable range temperature is present in the fixing temperature, and thus, the FCOT may be changed in upper and lower limits.

The parameters "60/x" and "60/w" are logically fixed values since they depend on the transport performance of the apparatus. However, if the standby time or the like is changed due to change in the control program of the transport system or the like, the parameters "60/x" and "60/w" may be changed.

In the next step 424, the number of processing sheets N is obtained. Then, the routine proceeds to step 426 to read the arithmetic expression (1), and then proceeds to step 428.

$$a+(60/x)\times c<b+(60/w)\times c \tag{1}$$

In step 428, the respective parameters received in step 422 and the number of processing sheets N obtained in step 424 are substituted in the arithmetic expression (1) to determine whether the arithmetic expression (1) is established, and then the routine proceeds to step 430.

In step 430, the determination result is determined. If the determination result in step 430 is "establishment", the fast heating mode that is currently set is maintained, and the routine proceeds to step 434. Further, if the determination result in step 430 is "non-establishment", the routine proceeds to step 432 to perform the switching process to the heat storage mode, and then proceeds to step 434.

In a case where the fixing mode is switched into the "heat storage mode", as shown in FIG. 7C, the MCU of the image forming section 240 controls the operations of the electric cylinders 378 and 382 so that the actuators 380 and 384 are contracted to expand the coil springs 374 and 376. Thus, as shown in FIG. 7D, the thermosensitive magnetic coil 314 and the fixing belt 302 are maintained in the state of being in contact with each other.

In the next step 418, the image processing is performed, and the routine ends.

Figure 12:
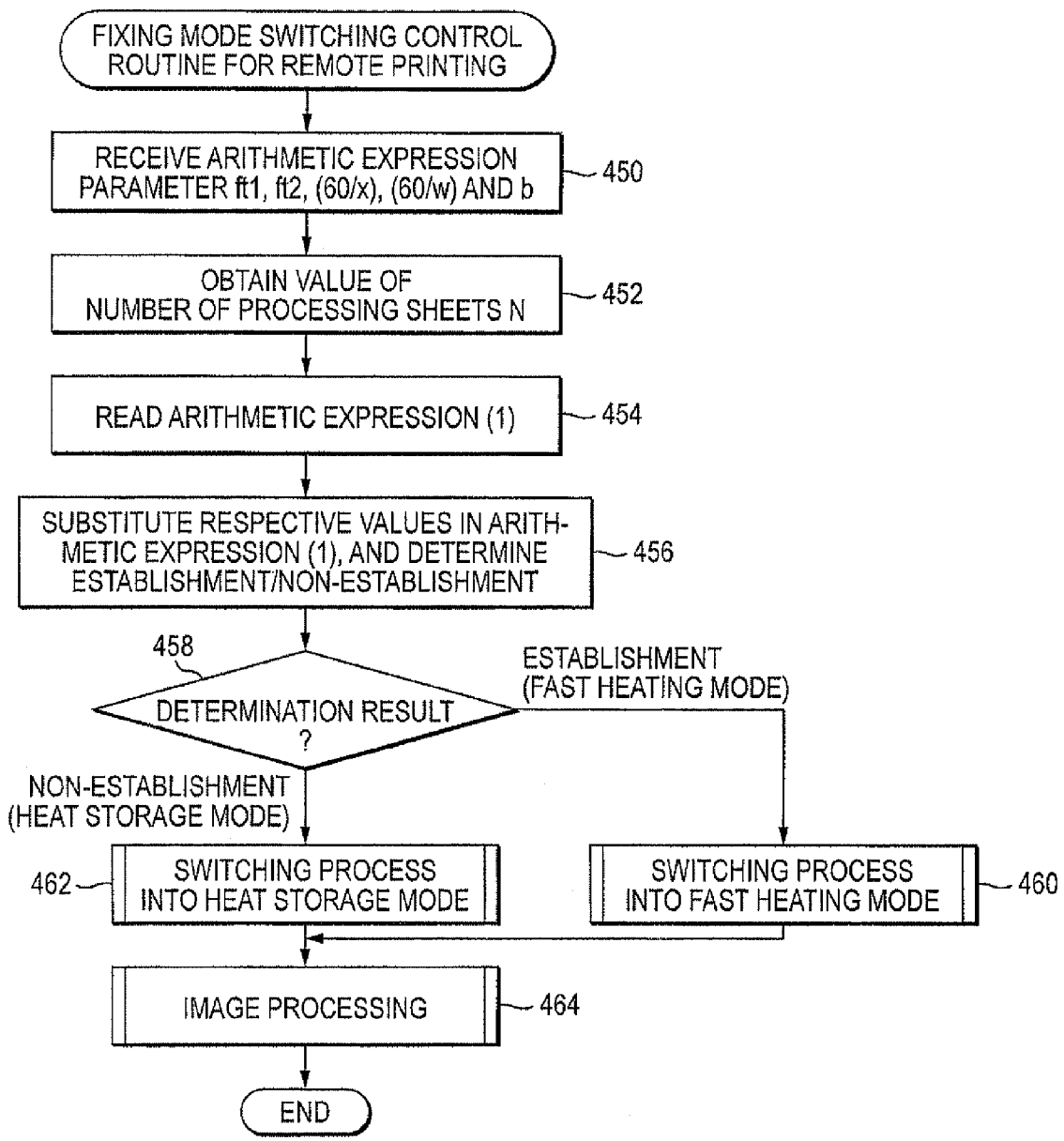
FIG. 12 is a flowchart illustrating details of a remote printing fixing mode switching control sub-routine of step 404 in FIG. 11.

FIG. 12 is a flowchart illustrating a remote printing fixing mode switching control sub-routine of step 404 in FIG. 11.

In step 450, the respective parameters ft1, ft2, "60/x", "60/w" and b in the arithmetic expression are received.

In the next step 452, the value of the number of processing sheets c is obtained. Then, the routine proceeds to step 454 to read the arithmetic expression (1), and proceeds to step 456.

In step 456, the respective parameters received in step 450 and the number of processing sheets N obtained in step 452 are substituted in the arithmetic expression (1) to determine whether the arithmetic expression (1) is established, and then the routine proceeds to step 458.

In step 458, the determination result is determined. If the determination result in step 458 is "establishment", the routine proceeds to step 460 to perform the switching process to the fast heating mode, and the routine proceeds to step 464. Further, if the determination result in step 458 is "non-establishment", the routine proceeds to step 462 to perform the switching process to the heat storage mode, and then proceeds to step 464.

In the next step 464, the image processing is performed, and the routine ends.

The fixing mode switching processes in steps 460 and 462 are performed as follows.

As described above, in a case where the job is received in a state where electric power is not supplied when the fixing device 64 is in the sleep state, and in a case where a process of 1 unit (for example, one job) is processed, the total throughput (total number of processing sheets N) is not determined and the optimal fixing mode is not determined. Thus, as the initial process, the process is started in the fast heating mode, and in a case where the optical fixing mode is determined on the basis of the total number of processing sheets N after the process is started, the mode is switched into the heat storage mode as necessary to perform the subsequent process. A case where the switching is not performed and the fast heating mode is maintained may also be included. By setting the mode to the fast heating mode in the initial process, it is possible to make the FCOT the shortest, at least. Further, it is possible to reduce the processing end time, compared with a case where the process is performed in the fixed fixing mode (process type 1).

In the embodiment, when the optimal fixing mode is determined by the arithmetic expression (1), the switching control (including a case where the current fixing mode is maintained) is performed, but for example, in a case where the job is set to a plurality of sets, the switching may be performed at the end of the set (process type 2).

For example, in a case where the image forming process is performed for 5 pages and 20 sets, in a case where it is determined that the heat storage mode is optimal as the fixing mode on page 3 of the first set, the process is performed in the fast heating mode up to page 5, and then, the mode may be switched into the heat storage mode. Thus, the user may confirm all the pages during standby.

Further, even in a case where the number of processing sheets (for example, 5 pages and 20 sets as described above) and the heat storage mode is selected, under the condition that the number of sets is determined, five pages are processed in the fast heating mode, and then, the mode may be switched into the heat storage mode.

Figure 13:
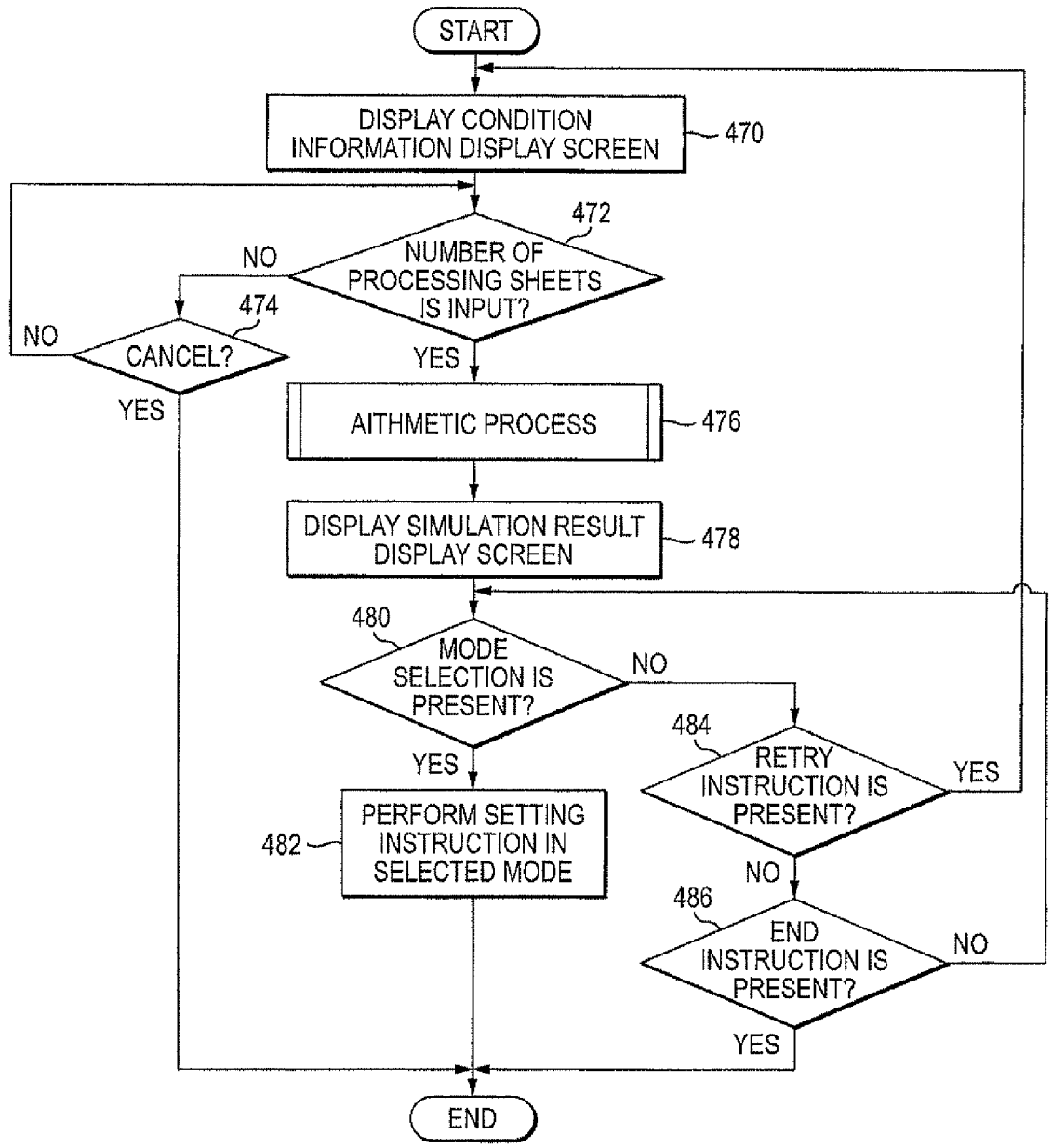
FIG. 13 is a control flowchart illustrating the flow of a simulation according to the embodiment.

Next, the flow of the process (simulation process) based on the process type 3 will be described with reference to the flowchart of FIG. 13.

A control program based on the flowchart may be stored in a storage section of a controller that controls the UI touch panel 216 of the image processing apparatus 10, or may be stored as one control program of the printer driver installed in the PC 21.

In step 470, the condition information display screen 216A (see FIG. 9) is displayed, and the routine proceeds to step 472. In step 472, it is determined whether the number of processing sheets is input (including confirmation). If the determination is negative, the routine proceeds to step 474 to determine whether cancel is present in the UI touch panel 216 by an operation of an existing clear key or the like, for example.

In a case where the determination is negative in step 474, the routine returns to step 472. Then, steps 472 and 474 are repeated until the determination is affirmative in steps 472 and 474.

Here, in a case where the determination is affirmative (cancel is instructed) in step 474, the routine ends. Further, if the determination is affirmative in step 472, it is determined that the number of processing sheets is input and confirmed. Then, the routine proceeds to step 476 to perform the arithmetic process including the establishment or non-establishment of the arithmetic expression (1) on the basis of the input number of processing sheets.

In the next step 478, the simulation result display screen 216D (see FIG. 10) is displayed. The user confirms the total processing time from the fast heating mode to the heat storage mode, the total processing time in the heat storage mode only and the total processing time in the fast heating mode only while viewing the screen, and uses the result as determination information about which mode the next process is performed in.

In the next step 480, it is determined whether mode selection is present by the operation of the fast heating mode selection button 216E or the heat storage mode selection button 216F. In a case where the determination is affirmative, the routine proceeds to step 482 to instruct the fixing device to set the selected mode, and the routine ends.

Further, if the determination is negative in step 480, the routine proceeds to step 484 to determine whether a retry instruction using the retry button 216G is present. If the determination is negative, the routine proceeds to step 486 to determine whether an end instruction using the end button 216H is present. If the determination is negative in step 486, the routine proceeds to step 480 to repeat steps 480, 484 and 486 until the determination is affirmative in any one step thereof.

In a case where the determination is affirmative in step 484, the routine proceeds to step 470, and the simulation may be retried. Further, if the determination is affirmative in step 486, the routine ends.

According to the embodiment, the process types are established in which the fast heating mode and the heat storage mode are set as the fixing mode and any one mode is selected. The fast heating mode and the heat storage mode have the contrary relationship that the fast heating mode is advantageous in FCOT and the heat storage mode is advantageous in throughput as shown in Table 1.

In the process type 1, the parameters are substituted in the arithmetic expression (1) to select the fixing mode in which the process is early completed, and the fast heating mode or the heat storage mode is selected according to whether the sign of inequality in the arithmetic expression (1) is established or not.

In the process type 2, the number of processing sheets is divided into a plurality of sets, at least one set is processed in the fast heating mode, and then, the fixing mode is selected on the basis of the entire number of processing sheets.

In the process type 3, the number of processing sheets is received, the processing end time in the fast heating mode only, the processing end time in the heat storage mode only and the processing end time in both usage of the fast heating mode and the heat storage mode are simulated, and the result is reported to the user. Thus, a desired fixing mode is selected.

In the process type 4, when the number of processing sheets is not determined, the initial process is performed in the fast heating mode in which FCOT is prior, and at a time point when the number of processing sheets is determined, the fixing mode in which the processing end time is early is selected (the fast heating mode is maintained or is switched into the heat storage mode).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a fixing device that has a fast heating mode in which temperature is relatively rapidly increased and a heat storage mode in which heat is stored in advance in a heat storage member for relatively high productivity, as a fixing mode in which a fixing member that heats a recording sheet for fixing is heated in advance, in a process of performing an image forming process with respect to the recording sheet; and
a selection section that selects any one of
a case where execution of a job indicating an image forming process of a predetermined batch throughput is instructed, and when the fixing device returns to a normal power state from a power saving state, the fixing mode in which the image forming process is early completed is selected on the basis of a total throughput of the job to perform the image forming process, and a case where during the total throughput of the job is not determined or in a case where the job corresponds to a plurality of sets, the fast heating mode is selected as an initial operation for at least the first set to perform the image forming process.

2. The image processing apparatus according to claim 1, further comprising:

a storage section that stores condition information of the fixing device, including
- a number of processing sheets per unit time in the fast heating mode,
- a number of processing sheets per unit time in the heat storage mode,
- a warming-up time in the fast heating mode,
- a warming-up time in the heat storage mode based on initial values including temperature of the heat storage member,
- a time for mode switching, and
- a temperature arrival time from the fast heating mode to the heat storage mode in a non-processing state;

a reception section that receives the total throughput of the job; and a report section that reports processing time in the fast heating mode, processing time in the heat storage mode and processing time when both of the fast heating mode and the heat storage mode are used, based on the condition information stored in the storage section, with respect to the total throughput received by the reception section.

3. The image processing apparatus according to claim 1, wherein the processing times are applicable as selection information of the selection section.

4. The image processing apparatus according to claim 1, wherein the power saving state is a power cut-off state in which electric power for heating at least the fixing member of the fixing device is completely cut off.

5. The image processing apparatus according to claim 1, wherein a type of the job in which the total throughput is not determined is a copy process of reading a document image by an image reading section and performing the image forming process on the basis of information on the read image, or is an on-demand printing process of receiving image information through a communication line and performing the image forming process on the basis of an image forming instruction input through a user interface.

6. The image processing apparatus according to claim 1, wherein in the heat storage mode, the heat storage member is in contact with the fixing member, and
in the fast heating mode, the heat storage member is spaced from the fixing member.

7. A processing time simulation apparatus comprising:

a storage section that stores, in a fixing device that has a fast heating mode in which temperature is relatively rapidly increased and a heat storage mode in which heat is stored in advance in a heat storage member for relatively high productivity as a fixing mode in which a fixing member that heats a recording sheet for fixing is heated in advance at a necessary fixing temperature in a process of performing an image forming process with respect to the recording sheet, condition information including of the fixing device, including
- a number of processing sheets per unit time in the fast heating mode,
- a number of processing sheets per unit time in the heat storage mode,
- a warming-up time in the fast heating mode,
- a warming-up time in the heat storage mode based on initial values including temperature of the heat storage member,
- a time for mode switching, and
- a temperature arrival time from the fast heating mode to the heat storage mode in a non-processing state;

a reception section that receives the total throughput in the fixing device; and a report section that reports processing time in the fast heating mode, processing time in the heat storage mode and processing time when both of the fast heating mode and the heat storage mode are used, based on the condition information stored in the storage section, with respect to the total throughput that is received by the reception section.

8. A non-transitory computer readable medium storing a program causing a computer to execute a process for a processing time simulation, the process comprising:

storing, in a fixing device that has a fast heating mode in which temperature is relatively rapidly increased and a heat storage mode in which heat is stored in advance in a heat storage member for relatively high productivity as a fixing mode in which a fixing member that heats a recording sheet for fixing is heated in advance at a necessary fixing temperature in a first process of performing an image forming process with respect to a recording sheet, condition information including the number of processing sheets per unit time in the fast heating mode, the number of processing sheets per unit time in the heat storage mode, warming-up time in the fast heating mode, warming-up time in the heat storage mode based on initial values including temperature of the heat storage member, time for mode switching, and temperature arrival time from the fast heating mode to the heat storage mode in a non-processing state;

receiving the total throughput in the fixing device; and reporting processing time in the fast heating mode, processing time in the heat storage mode and processing time when both of the fast heating mode and the heat storage mode are used, based on the stored condition information, with respect to the received total throughput.

* * * * *